(12) United States Patent
Malinak et al.

(10) Patent No.: US 10,048,074 B1
(45) Date of Patent: Aug. 14, 2018

(54) POLAR REGION OPERATING ATTITUDE AND HEADING REFERENCE SYSTEM

(71) Applicant: Honeywell International Inc., Morris Plains, NJ (US)

(72) Inventors: Pavol Malinak, Markusovce (SK); Zdenek Kana, Dubnany (CZ); Milos Sotak, Slavkov u Brna (CZ); Radek Baranek, Litovel (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/461,028

(22) Filed: Mar. 16, 2017

(51) Int. Cl.
    *G01C 21/16* (2006.01)
    *G01C 21/18* (2006.01)
    *G01C 23/00* (2006.01)
    *G01P 15/18* (2013.01)

(52) U.S. Cl.
    CPC .......... *G01C 21/16* (2013.01); *G01C 21/165* (2013.01); *G01C 21/18* (2013.01); *G01C 23/00* (2013.01); *G01P 15/18* (2013.01)

(58) Field of Classification Search
    CPC ...... G01C 21/16; G01C 21/18; G01C 21/165; G01C 23/00; G01P 15/18
    See application file for complete search history.

(56) References Cited

U.S. PATENT DOCUMENTS

| 7,409,290 B2 | 8/2008 | Lin | |
| 8,442,703 B2 | 5/2013 | Petillon | |
| 8,645,063 B2 * | 2/2014 | Fortier | G01C 21/16 701/400 |
| 2002/0059027 A1 * | 5/2002 | An | G01V 11/00 702/2 |
| 2005/0138825 A1 | 6/2005 | Manfred | |

(Continued)

OTHER PUBLICATIONS

Riaz, "INS/GPS Based State Estimation of Micro Air Vehicles Parametric Study Using Extended Kalman Filter (EKF) Schemes", Innovative Systems Design and Engineering, pp. 114, vol. 2, No. 3, Publisher: The International Institute for Science, Technology and Education (IISTE).

(Continued)

*Primary Examiner* — Michael J Zanelli
(74) *Attorney, Agent, or Firm* — Fogg & Powers LLC

(57) ABSTRACT

An attitude and heading reference system (AHRS) for a vehicle comprises an IMU that generates inertial measurements, a heading source that generates heading measurements, an attitude filter in communication with the IMU, and a heading filter in communication with the heading source. The attitude filter receives inertial measurements from the IMU; computes an attitude estimation comprising attitude estimates and covariances for the attitude estimates; and outputs the attitude estimation. The heading filter receives the heading measurements, when available, from the heading source; receives the attitude estimation, comprising the attitude estimates and the covariances for the attitude estimates; computes a heading estimation comprising a heading mean estimate and a heading variance; and outputs the heading estimation. The attitude estimation output from the attitude filter is independent of any availability of the heading measurements, such that the attitude estimation output is available at all earth regions during operation of the vehicle.

18 Claims, 2 Drawing Sheets

(56) References Cited

U.S. PATENT DOCUMENTS

Figure 1:
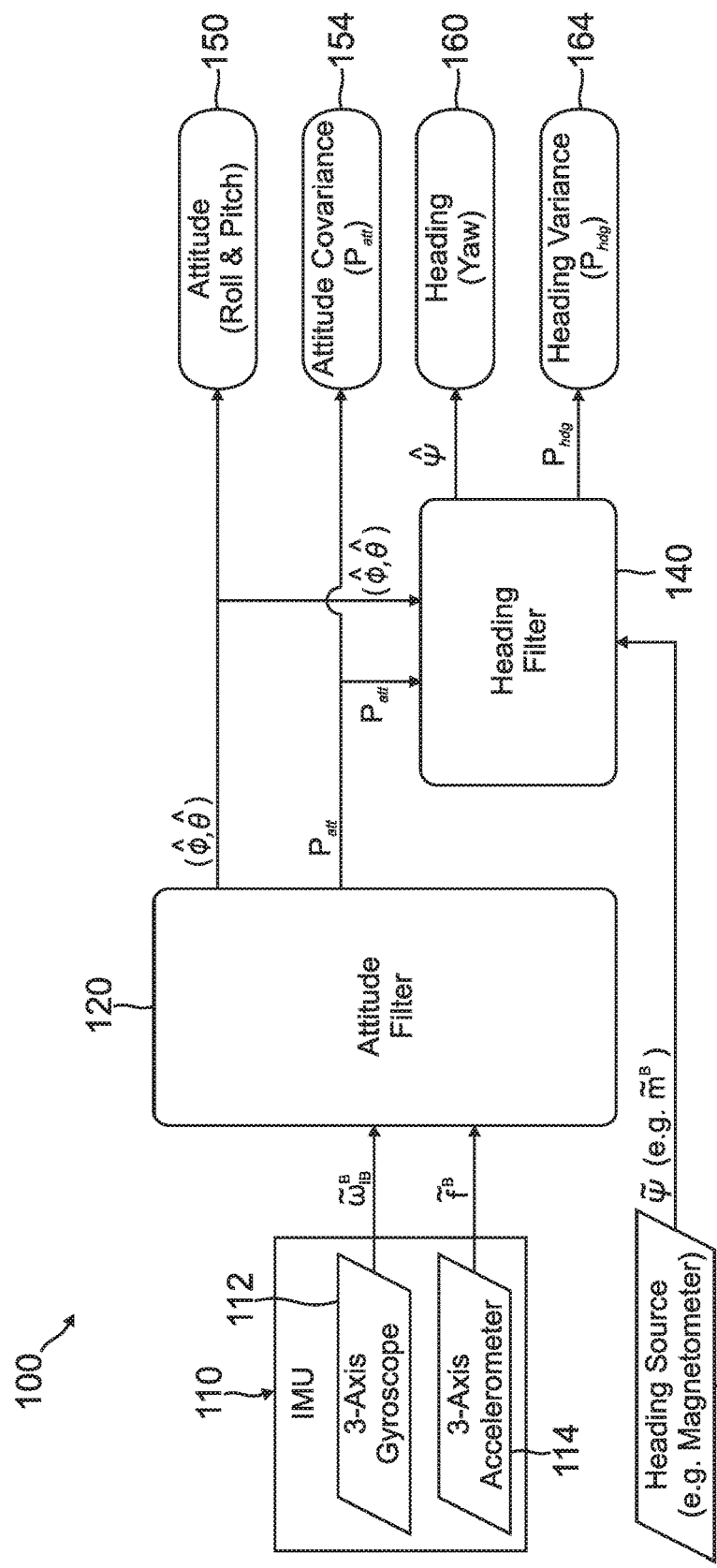

2011/0184594 A1* 7/2011 Manfred .............. G01C 21/165
  701/14
2017/0146347 A1 5/2017 Sotak et al.

OTHER PUBLICATIONS

Sotak, et al., "Methods for Attitude and Heading Reference System to Mitigate Vehicle Acceleration Effects", U.S. Appl. No. 14/949,437, filed Nov. 23, 2015, Published in: US.

* cited by examiner

POLAR REGION OPERATING ATTITUDE AND HEADING REFERENCE SYSTEM

BACKGROUND

The attitude and heading reference system (AHRS) for an aircraft is typically based on a complementary filtering algorithm. In order to increase solution accuracy, statistical filters, typically based on first-order approximations (e.g., extended Kalman filters), are commonly used. A drawback of this approach is in the polar regions, where the heading (e.g., magnetic aiding) is not sufficient to maintain the filter in its linear region.

At the polar regions, the horizontal component of the magnetic field vector becomes very small (or zero), making heading determination a challenging task. Furthermore, in the immediate vicinity of the geographic pole, very (or infinitely) high vertical angular rates are required to keep a vehicle locally-levelled (tangent) coordinate system aligned to the north. However, in such cases, the AHRS must be able to provide the user with reliable estimates of the attitude (roll and pitch angles) even though the output from the heading source is unreliable or completely missing.

SUMMARY

An attitude and heading reference system (AHRS) for a vehicle comprises an inertial measurement unit (IMU) onboard the vehicle and configured to generate inertial measurements comprising angular rate and acceleration measurements during operation of the vehicle; a heading source onboard the vehicle and configured to generate heading measurements during operation of the vehicle; an attitude filter onboard the vehicle and in operative communication with the IMU; and a heading filter onboard the vehicle and in operative communication with the heading source. The attitude filter is configured to receive the inertial measurements from the IMU; compute an attitude estimation, comprising attitude estimates and covariances for the attitude estimates, based on the inertial measurements; and output the attitude estimation, comprising the attitude estimates and the covariances for the attitude estimates. The attitude estimation is independent of a geographic latitude of the vehicle, and is based on an error parameterization performed between a floating platform frame of the vehicle, not corrected for gyroscope sensor errors, and a body frame of reference, wherein earth and transport rates are estimated in the platform frame, avoiding a polar singularity. The heading filter is configured to receive the heading measurements, when available, from the heading source; receive the attitude estimation, comprising the attitude estimates and the covariances for the attitude estimates, from the attitude filter; compute a heading estimation, comprising a heading mean estimate and a heading variance, based on the heading measurements and the attitude estimation; and output the heading estimation, comprising the heading mean estimate and the heading variance, when the heading measurements are available. The attitude estimation output from the attitude filter is independent of any availability of the heading measurements, such that the attitude estimation output is available at all earth regions during operation of the vehicle.

DRAWINGS

Figure 2:
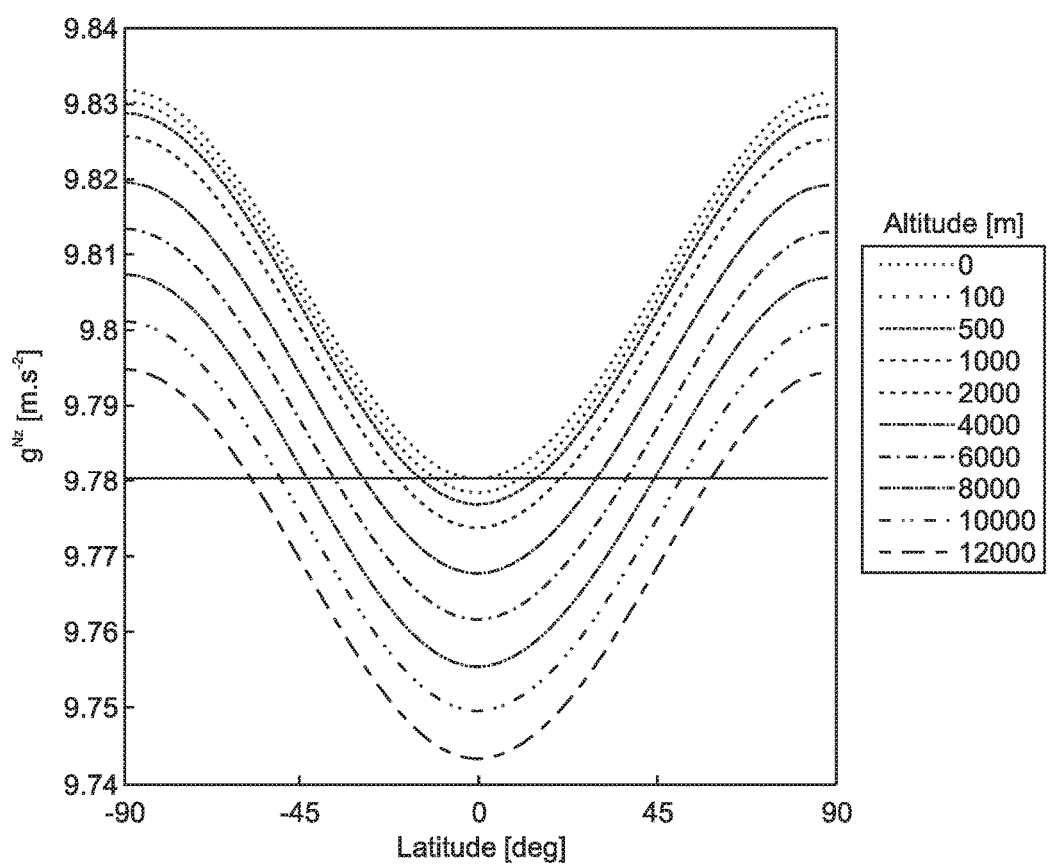

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 1 is a block diagram of an attitude and heading reference system (AHRS) for a vehicle, according to an exemplary embodiment; and FIG. 2 is a graph of gravity model variations for various latitudes and altitudes of a vehicle.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An attitude and heading reference system (AHRS) for a vehicle, such as an aircraft, a helicopter, a missile, a spacecraft, a rocket, a boat, a submarine, an automobile, a truck, or any vehicle or apparatus for which attitude and heading is desirable, is described herein, which is adapted with methods that allow the AHRS to properly operate everywhere over the earth. In this AHRS, the attitude estimation is decoupled from the heading estimation, such that the overall solution is decoupled into two separate statistical filters, an attitude filter and a heading filter, in a cascaded scheme. Decoupling of the attitude and heading estimation in the AHRS by use of the separate statistical filters provides the advantage that attitude estimates of a vehicle are available even during polar region operation, or any other operation where heading measurements are unavailable.

In the described system and methods, an attitude estimate is generated in the attitude filter independent of a heading estimate. The attitude estimate, in terms of its mean and corresponding uncertainty (covariance matrix), is fed from the attitude filter into the heading filter. A heading estimate, including a mean and uncertainty, is then generated in the heading filter. The attitude estimate and heading estimate are then separately outputted for use by a vehicle navigation system.

In order to make the attitude filter operation independent of the geographic latitude of the vehicle, an error parameterization is performed in the vehicle "floating" platform frame (not corrected for gyroscope sensor errors) and body frames of reference. The so-called "floating" platform frame (hereafter, P-frame) differs from the well known platform (or wander) frame in the sense that it is not corrected for the gyroscope measurement induced errors. The filter error states related to the attitude, inertial measurement unit (IMU) sensors estimation errors, as well as the vehicle's acceleration, are estimated in the non-drifting (body) frame, which is contrary to the navigation (tangential) frame commonly employed for AHRS mechanizations. On the other hand, the earth and transport rates are estimated in the platform frame, avoiding the polar singularity (and latitude dependence as such). The described approach also mitigates impact of the equator-to-pole variations in gravity, allowing for improved attitude performance.

It is only in the heading filter where the common navigation frame (N-frame) is employed to estimate the vertical component of the vehicle's transport rate. The heading filter also facilitates an appropriate statistical modeling and approximation of the errors coming from the attitude filter as well as the heading mechanization itself The present approach provides for increased attitude availability in polar regions for a gravity seeking AHRS implementation. The methods can also be implemented within an Air Data aided AHRS (ADAHRS), a GPS aided AHRS, or other navigation systems. The future vehicle navigation architectures would benefit from the described approach by also offering the uncertainty of the attitude/heading estimates.

As used herein, an earth polar region is typically defined as the region north of about 78 degrees north latitude, or the region south of about 78 degrees south latitude.

Further details of the disclosed system and methods are described hereafter with reference to the drawings.

FIG. 1 is a block diagram of an AHRS 100, according to one embodiment. The AHRS 100 generally includes an inertial measurement unit (IMU) 110 configured to generate inertial measurements, and an attitude filter 120 operatively connected with IMU 110. In addition, AHRS 100 includes a heading source 130, such as a magnetometer, which generates heading measurements, and a heading filter 140 operatively connected with heading source 1 and attitude filter 120.

The IMU 110 can include a 3-axis gyroscope 112 and a 3-axis accelerometer 114, for example. The attitude filter 120 is configured to receive the inertial measurements from IMU 110. For example, attitude filter 120 can receive a measured quantity of angular rate ($\tilde{\omega}_{IB}^B$) output from gyroscope 112, and attitude filter 120 can receive a measured quantity of specific force (iB) output from accelerometer 114. The attitude filter 120 is configured to generate an attitude estimation, including attitude (roll and pitch) estimates ($\hat{\varphi}$, $\hat{\theta}$) and covariances ($P_{att}$) for the attitude estimates.

The heading filter 140 is configured to receive a measured heading ($\tilde{\psi}$, e.g., based on the magnetometer measurements $\tilde{m}^B$) output from heading source 130. The heading filter 140 also receives the attitude estimates, and the covariances for the attitude estimates from attitude filter 120. The heading filter 140 is configured to generate and output a heading estimation, including a heading mean estimate ($\hat{\psi}$) and a heading variance ($P_{hdg}$).

The attitude filter 120 outputs the attitude estimates (roll and pitch) at 150, as well as an attitude covariance matrix at 154. The heading filter 140 outputs the heading estimate (yaw) at 160, as well as a heading variance at 164. These attitude and heading estimates are then used by a vehicle navigation system, such as an aircraft navigation system.

By having the attitude and heading estimation decoupled into two separate filters in a cascaded scheme, the attitude is completely independent of the heading in AHRS 100. This prevents any disruptive effect of heading measurements, such as from a magnetometer, on the attitude estimates, while allowing the AHRS 100 to operate without limitations when heading measurements are not available.

As discussed in further detail hereafter, in attitude filter 120 all error parametrizations are performed solely by use of two reference frames: the body frame and the "floating" platform frame. The "floating" platform frame is locally leveled, drifting with gyroscope sensor errors. This has the advantage of avoiding all vulnerabilities due to the navigation frame, typically called NED (North-East-Down) in the polar regions. In addition, attitude errors are resolved in the body frame, which has the advantage that the attitude error states are estimated in the non-drifting (body) frame. Further, Earth and transport rate errors are resolved in the drifting platform frame, which has the advantage of avoiding the polar singularity encountered when using the navigation frame. Also, equator-to-pole gravity variations can be estimated through appropriate gravity variations modeling in the attitude filter.

The heading filter 140 provides estimation of the body-frame-resolved gyroscope sensor errors related to the heading, and estimation of the vertical angular rate of the navigation frame (Earth and transport rates as a single quantity). The heading filter also provides an approximation of the attitude filter errors related to the heading. This provides the advantage of an appropriate statistical modelling and approximation of the errors coming from the attitude filter, as well as the heading mechanization itself. In addition, the heading filter provides the heading estimates while not affecting the attitude filter at non-polar regions of vehicle operation.

Further details related to the attitude filter and heading filter are described in the following sections.

Attitude Filter

In the attitude filter, the platform frame (P-frame) is aligned with the corresponding navigation (e.g., NED) frame at the beginning of the operation. Drifting with gyroscope sensor errors is not corrected via position corrections (compared to the wander-frame known from integrated inertial navigation systems). The attitude filter uses more appropriate Earth and transport rates modelling as compared to state-of-the-art models.

The angular rate of the P-frame with respect to the inertial frame ($\omega_{IP}^P$) is represented by the following equation:

$$\omega_{IP}^P = \omega_{EP}^P + \omega_{IE}^P \tag{1}$$

where $\omega_{EP}^P$ is the so-called platform transport rate, i.e., the angular velocity of the P-frame with respect to the Earth-centered Earth-fixed (ECEF) frame, and $\omega_{IE}^P$ is the Earth rate. The transport rate (P-frame) can be represented by the following expression:

$$\omega_{EP}^P \approx \frac{1}{R}\begin{bmatrix} -v_{EB}^{Nx}\sin\alpha + v_{EB}^{Ny}\cos\alpha \\ -v_{EB}^{Nx}\cos\alpha - v_{EB}^{Ny}\sin\alpha \\ 0 \end{bmatrix} \tag{2}$$

where R is the approximate distance of the vehicle from the center of the Earth, $v_{EB}^{Nx}$ is the north component of the vehicle's ground velocity (when expressed in the N-frame), $v_{EB}^{Ny}$ is the east component of the vehicle's ground velocity (when expressed in the N-frame), and $\alpha$ is the platform angle. The earth rate (P-frame) can be represented by the following expression:

$$\omega_{IE}^P = \begin{bmatrix} \omega_{ie}\cos\alpha\cos\varphi \\ -\omega_{ie}\sin\alpha\cos\varphi \\ -\omega_{ie}\sin\varphi \end{bmatrix} \tag{3}$$

where $\omega_{ie}$ is the angular rate of the Earth's rotation around its axis expressed with respect to the inertial frame $$\left(\omega_{ie} \approx 7.292115 \times 10^{-5}\left[\frac{rad}{s}\right]\right),$$

and $\varphi$ is the geographic latitude.

The Earth rate and transport rate can be modelled as first-order Gauss-Markov (GM-1) processes using the following equations:

$$\dot{\delta\omega}_{GM,IE}{}^P = -1/\tau_{GM,IE}\delta\omega_{GM,IE}{}^P + w_{GM,IE}{}^P \quad (4)$$

$$\dot{\delta\omega}_{GM,EP}{}^P = -1/\tau_{GM,EP}\delta\omega_{GM,EP}{}^P + w_{GM,EP}{}^P \quad (5)$$

where $\tau_{GM,IE}$ is the time constant of the GM-1 process used to model the Earth rate, $\delta\omega_{GM,IE}{}^P$ is Earth rate estimation error, $w_{GM,IE}{}^P$ is the driving noise of the GM-1 process used to model the Earth rate, $\tau_{GM,EP}$ is the time constant of the GM-1 process used to model the transport rate, $\delta\omega_{GM,EP}{}^P$ is transport rate estimation error, and $w_{GM,EP}{}^P$ is the driving noise of the GM-1 process used to model the transport rate.

The attitude filter can also provide Gravity variations modeling, which deals with local Gravity variations, capturing the difference between the Gravity over the equator and polar regions of the Earth. When Gravity variations are not modeled, the accelerometer bias estimates will typically be corrupted.

FIG. 2 is a graph showing the gravity model variations for various latitudes and altitudes of a vehicle. Error in the Gravity variations ($\delta b_{grav}{}^{Pz}$) can be modeled as a GM-1 process using the following equation:

$$\dot{\delta b}_{grav}{}^{Pz} = -1/\tau_{grav}\delta b_{grav}{}^{Pz} + w_{GMgrav}{}^P \quad (6)$$

where $\tau_{grav}$ is the time constant of the GM-1 process, $\delta b_{grav}{}^{Pz}$ is the Gravity variations estimation error, and $w_{GMgrav}{}^P$ is the driving noise of the GM-1 process.

An exemplary process model that can be employed in the attitude filter is defined by the following expression:

$$\begin{bmatrix} \dot{\epsilon}^B \\ \dot{\delta b}_{gyr}^B \\ \dot{\delta a}^B \\ \dot{\delta\omega}_{GM,IE}^P \\ \dot{\delta\omega}_{GM,EP}^P \\ \dot{\delta b}_{acc}^B \\ \dot{\delta b}_{grav}^{Pz} \end{bmatrix} = \begin{bmatrix} -[\hat{\omega}_{IB}^B \times] & I_3 & 0_{3\times3} & \hat{C}_P^B & \hat{C}_P^B & 0_{3\times3} & 0_{3\times1} \\ 0_{3\times3} & -1/\tau_{gyr} & 0_{3\times3} & 0_{3\times3} & 0_{3\times3} & 0_{3\times3} & 0_{3\times1} \\ 0_{3\times3} & 0_{3\times3} & -1/\tau_{acceleration} & 0_{3\times3} & 0_{3\times3} & 0_{3\times3} & 0_{3\times1} \\ 0_{3\times3} & 0_{3\times3} & 0_{3\times3} & -1/\tau_{GM,IE} & 0_{3\times3} & 0_{3\times3} & 0_{3\times1} \\ 0_{3\times3} & 0_{3\times3} & 0_{3\times3} & 0_{3\times3} & -1/\tau_{GM,EP} & 0_{3\times3} & 0_{3\times1} \\ 0_{3\times3} & 0_{3\times3} & 0_{3\times3} & 0_{3\times3} & 0_{3\times3} & -1/\tau_{acc} & 0_{3\times1} \\ 0_{1\times3} & 0_{1\times3} & 0_{1\times3} & 0_{1\times3} & 0_{1\times3} & 0_{1\times3} & -1/\tau_{grav} \end{bmatrix} \begin{bmatrix} \epsilon^B \\ \delta b_{gyr}^B \\ \delta a^B \\ \delta\omega_{GM,IE}^P \\ \delta\omega_{GM,EP}^P \\ \delta b_{acc}^B \\ \delta b_{grav}^{Pz} \end{bmatrix} + \quad (7)$$

$$\begin{bmatrix} -I_3 & 0_{3\times3} & 0_{3\times3} & 0_{3\times3} & 0_{3\times3} & 0_{3\times3} & 0_{3\times1} \\ 0_{3\times3} & I_3 & 0_{3\times3} & 0_{3\times3} & 0_{3\times3} & 0_{3\times3} & 0_{3\times1} \\ 0_{3\times3} & 0_{3\times3} & I_3 & 0_{3\times3} & 0_{3\times3} & 0_{3\times3} & 0_{3\times1} \\ 0_{3\times3} & 0_{3\times3} & 0_{3\times3} & I_3 & 0_{3\times3} & 0_{3\times3} & 0_{3\times1} \\ 0_{3\times3} & 0_{3\times3} & 0_{3\times3} & 0_{3\times3} & I_3 & 0_{3\times3} & 0_{3\times1} \\ 0_{3\times3} & 0_{3\times3} & 0_{3\times3} & 0_{3\times3} & 0_{3\times3} & I_3 & 0_{3\times1} \\ 0_{1\times3} & 0_{1\times3} & 0_{1\times3} & 0_{1\times3} & 0_{1\times3} & 0_{1\times3} & 1 \end{bmatrix} \begin{bmatrix} w_{gyr}^B \\ w_{GMgyrB}^B \\ w_{GMacceleration}^B \\ w_{GM,IE}^P \\ w_{GM,EP}^P \\ w_{GMaccB}^B \\ w_{GMgrav}^P \end{bmatrix}$$

An exemplary measurement model that can be employed in the attitude filter is defined by the following expression:

$$[\delta\tilde{f}^B] = \left[\left[\left(\hat{C}_P^B\left(g^P - \begin{bmatrix} 0 \\ 0 \\ \hat{b}_{grav}^{Pz} \end{bmatrix}\right)\right)\times\right] 0_{3\times3} \; I_3 \; 0_{3\times3} \quad (8)$$

$$0_{3\times3} \; I_3 \; \hat{C}_P^B(:,3)\right] \begin{bmatrix} \epsilon^B \\ \delta b_{gyr}^B \\ \delta a^B \\ \delta\omega_{GM,IE}^P \\ \delta\omega_{GM,EP}^P \\ \delta b_{acc}^B \\ \delta b_{grav}^{Pz} \end{bmatrix} + [-I_3 \; -\hat{C}_P^B] \begin{bmatrix} w_{sf}^B \\ w_{grav}^P \end{bmatrix}$$

In equations 7 and 8, the errors state vectors are represented by the following parameters: $\epsilon^B$, which is the attitude errors (body-frame); $\delta b_{gyr}^B$, which is the gyroscope bias errors; $\delta a^B$, which is the vehicle acceleration errors; $\delta\omega_{GM,IE}^P$, which is the Earth rate (P-frame) errors; $\delta\omega_{GM,EP}^P$, which is the transport rate (P-frame) errors; $\delta b_{acc}^B$, which is the accelerometer bias errors; and $\delta b_{grav}^{Pz}$, which is the equator-to-pole gravity variation error. The measurement $\delta\tilde{f}^B$ is the specific force measurement error. The consequences of the proposed approach on filter architecture can also be seen from comparing equations (7) and (8) with the corresponding process and measurement model equations disclosed in U.S. application Ser. No. 14/949,437, filed on Nov. 23, 2015, entitled Methods for Attitude and Heading Reference System to Mitigate Vehicle Acceleration Effects, which is based on a N-frame embodiment. The disclosure of U.S. application Ser. No. 14/949,437 is incorporated by reference herein.

Heading Filter

The fundamental kinematics for the heading can be described by the following equation:

$$\dot{\psi} = \frac{\sin\phi}{\cos\theta}\omega_{NB}^{By} + \frac{\cos\phi}{\cos\theta}\omega_{NB}^{Bz} = \quad (9)$$

$$\left(\frac{\sin\phi}{\cos\theta}(\tilde{\omega}_{IB}^{By} - b_{gyr}^{By} - w_{gyr}^{By}) + \frac{\cos\phi}{\cos\theta}(\tilde{\omega}_{IB}^{Bz} - b_{gyr}^{Bz} - w_{gyr}^{Bz})\right) -$$

-continued $$\left(\frac{\sin\phi}{\cos\theta}\omega_{IN}^{By} + \frac{\cos\phi}{\cos\theta}\omega_{IN}^{Bz}\right) \triangleq \omega_{gyr} - \omega_{ETR}$$

where $\varphi$ is the roll angle, $\theta$ is the pitch angle, $\omega_{NB}^{By}$ and $\omega_{NB}^{Bz}$ are the y-axis and z-axis components of the true (theoretic) angular rate of the B-frame with respect to the N-frame, respectively; $\tilde{\omega}_{IB}^{By}$ and $\tilde{\omega}_{IB}^{Bz}$ are the gyroscope y-axis and z-axis measurements, respectively; $b_{gyr}^{By}$ and $b_{gyr}^{Bz}$ are the y-axis and z-axis gyroscope biases, respectively; $w_{gyr}^{By}$ and $w_{gyr}^{Bz}$ are the gyroscope y-axis and z-axis white noise, respectively; and $$\omega_{gyr} \triangleq \frac{\sin\phi}{\cos\theta}(\tilde{\omega}_{IB}^{By} - b_{gyr}^{By} - w_{gyr}^{By}) + \frac{\cos\phi}{\cos\theta}(\tilde{\omega}_{IB}^{Bz} - b_{gyr}^{Bz} - w_{gyr}^{Bz}) \quad (10)$$

$$\omega_{ETR} \triangleq \frac{\sin\phi}{\cos\theta}\omega_{IN}^{By} + \frac{\cos\phi}{\cos\theta}\omega_{IN}^{Bz} \quad (11)$$

where $\omega_{gyr}$ models the gyroscope-related factors and $\omega_{ETR}$ takes into account the Earth's and transport rates-related factors. An error model for the heading filter can be represented by the following equation:

$$\delta\dot{\psi} = \delta\omega_{gyr} - \delta\omega_{ETR} \quad (12)$$

where $\delta\omega_{gyr}$ is the estimation error of the $\omega_{gyr}$ quantity, and $\delta\omega_{ETR}$ is the $\omega_{ETR}$ quantity estimation error. Applying the first-order approximations, $\delta\omega_{gyr}$ can be represented by the following equation:

$$\delta\omega_{gyr} = -\frac{\sin\hat{\phi}}{\cos\hat{\theta}}\delta b_{gyr}^{By} - \frac{\cos\hat{\phi}}{\cos\hat{\theta}}\delta b_{gyr}^{Bz} + w_{\omega,att} \quad (13)$$

where $\hat{\varphi}$ and $\hat{\theta}$ are the estimated roll and pitch angles, respectively; $\delta b_{gyr}^{By}$ and $\delta b_{gyr}^{Bz}$ are the y-axis and z-axis gyroscope bias error estimates, respectively, and $w_{\omega,att}$ stands for the noise modeling of the remaining attitude filter errors (influences) affecting the estimation process. The steady-state variance of the $w_{\omega,att}$ noise is computed by linear approximation of the attitude filter errors affecting the heading estimation as follows:

$$\sigma_{\omega,att}^2 = J_{(\hat{\phi},\hat{\theta},\tilde{\omega}_{gyr}^{By},\tilde{\omega}_{gyr}^{Bz})}^{w_{\omega,att}} \begin{bmatrix} P_{\hat{\phi},\hat{\theta}} & 0_{2\times 2} \\ 0_{2\times 2} & P_{w_{gyr}^{By,Bz}} \end{bmatrix} \left(J_{(\hat{\phi},\hat{\theta},\tilde{\omega}_{gyr}^{By},\tilde{\omega}_{gyr}^{Bz})}^{w_{\omega,att}}\right)^T \quad (14)$$

where $P_{\hat{\phi},\hat{\theta}}$ is the roll and pitch angle cross-covariance matrix (obtained from the attitude filter), $P_{w_{gyr}^{By,Bz}}$ is the gyroscope y-axis and z-axis white noise cross-covariance matrix, and $$J_{(\hat{\phi},\hat{\theta},\tilde{\omega}_{gyr}^{By},\tilde{\omega}_{gyr}^{Bz})}^{w_{\omega,att}}$$

is so-called Jacobian evaluated at the point $(\hat{\phi},\hat{\theta},\hat{\omega}_{gyr}^{By},\hat{\omega}_{gyr}^{Bz})$, which is defined as:

$$J_{(\hat{\phi},\hat{\theta},\tilde{\omega}_{gyr}^{By},\tilde{\omega}_{gyr}^{Bz})}^{w_{\omega,att}} = \begin{bmatrix} \frac{\partial \delta\omega_{gyr}}{\partial \phi} & \frac{\partial \delta\omega_{gyr}}{\partial \theta} & \frac{\partial \delta\omega_{gyr}}{\partial \omega_{IB}^{By}} & \frac{\partial \delta\omega_{gyr}}{\partial \omega_{IB}^{Bz}} \end{bmatrix}_{(\hat{\phi},\hat{\theta},\tilde{\omega}_{gyr}^{By},\tilde{\omega}_{gyr}^{Bz})} \quad (15)$$

The $\delta\omega_{ETR}$ error term can be represented by the following equation:

$$\delta\omega_{ETR} = (\cos\hat{\psi}\tan\hat{\theta})w_{ETR}^{Nx} + (\sin\hat{\psi}\tan\hat{\theta})w_{ETR}^{Ny} + \delta\omega_{GM,ETR}^{Nz} \quad (16)$$

where $\hat{\theta}$ and $\hat{\psi}$ stand for the estimated pitch and heading angles, and $\delta\omega_{GM,ETR}^{Nz}$ is the estimation error of the vertical Earth's and transport rate computed in the navigation frame (N-frame). The $\delta\omega_{GM,ETR}^{Nz}$ can be modeled as a GM-1 process with a fixed time constant using the following equation:

$$\delta\dot{\omega}_{GM,ETR}^{Nz} = -1/\tau_{GM,ETR}\delta\omega_{GM,ETR}^{Nz} + w_{GM,ETR}^{Nz} \quad (17)$$

where $\tau_{GM,ETR}$ is the time constant of the GM-1 process and $w_{GM,ETR}^{Nz}$ is its driving noise.

An exemplary process model that can be employed in the heading filter is defined by the following equation:

$$\begin{bmatrix} \delta\dot{\psi} \\ \delta\dot{b}_{gyr}^{By} \\ \delta\dot{b}_{gyr}^{Bz} \\ \delta\dot{\omega}_{GM,ETR}^{Nz} \end{bmatrix} = \begin{bmatrix} 0 & -\frac{\sin\hat{\phi}}{\cos\hat{\theta}} & -\frac{\cos\hat{\phi}}{\cos\hat{\theta}} & -1 \\ 0 & -1/\tau_{gyr}^{By} & 0 & 0 \\ 0 & 0 & -1/\tau_{gyr}^{Bz} & 0 \\ 0 & 0 & 0 & -1/\tau_{GM,ETR}^{Nz} \end{bmatrix} \begin{bmatrix} \delta\psi \\ \delta b_{gyr}^{By} \\ \delta b_{gyr}^{Bz} \\ \delta\omega_{GM,ETR}^{Nz} \end{bmatrix} + \quad (18)$$

$$\begin{bmatrix} 1 & -\cos\hat{\psi}\tan\hat{\theta} & -\sin\hat{\psi}\tan\hat{\theta} & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} w_{\omega,att} \\ w_{ETR}^{Nx} \\ w_{ETR}^{Ny} \\ w_{GMgyrB}^{By} \\ w_{GMgyrB}^{Bz} \\ w_{GM,ETR}^{Nz} \end{bmatrix}$$

where in the $$\frac{\sin\hat{\phi}}{\cos\hat{\theta}}$$

and $$\frac{\cos\hat{\phi}}{\cos\hat{\theta}}$$

terms, the roll and pitch estimates from the attitude filter are used, and the variance of the $w_{\omega,att}$ term is computed based on equation (14). An exemplary measurement model that can be employed in the heading filter is defined by the following equation:

$$[\delta\tilde{\psi}] = [1 \quad 0 \quad 0 \quad 0] \begin{bmatrix} \delta\psi \\ \delta b_{gyr}^{By} \\ \delta b_{gyr}^{Bz} \\ \delta\omega_{GM,ETR}^{Nz} \end{bmatrix} - w_\psi \quad (19)$$

In equations 18 and 19, the errors state vectors are represented by the following parameters: $\delta\psi$, which is the heading error; $\delta\omega_{GM,ETR}^{Nz}$, which is the error in the z-axis angular velocity of the navigation frame (e.g., NED); $\delta b_{gyr}^{By}$, which is the gyroscope lateral bias errors; and $\delta b_{gyr}^{Bz}$, which is the gyroscope vertical bias errors. The parameter $\delta\tilde{\psi}$ is the error in the heading measurement.

A processor used in the present system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes an attitude and heading reference system (AHRS) for a vehicle, the AHRS comprising an inertial measurement unit (IMU) onboard the vehicle and configured to generate inertial measurements comprising angular rate and acceleration measurements during operation of the vehicle; a heading source onboard the vehicle and configured to generate heading measurements during operation of the vehicle; an attitude filter onboard the vehicle and in operative communication with the IMU; and a heading filter onboard the vehicle and in operative communication with the heading source. The attitude filter is configured to receive the inertial measurements from the IMU; compute an attitude estimation, comprising attitude estimates and covariances for the attitude estimates, based on the inertial measurements, wherein the attitude estimation is independent of a geographic latitude of the vehicle, and is based on an error parameterization performed between a floating platform frame of the vehicle, not corrected for gyroscope sensor errors, and a body frame of reference, wherein earth and transport rates are estimated in the platform frame, avoiding a polar singularity; and output the attitude estimation, comprising the attitude estimates and the covariances for the attitude estimates. The heading filter is configured to receive the heading measurements, when available, from the heading source; receive the attitude estimation, comprising the attitude estimates and the covariances for the attitude estimates, from the attitude filter; compute a heading estimation, comprising a heading mean estimate and a heading variance, based on the heading measurements and the attitude estimation; and output the heading estimation, comprising the heading mean estimate and the heading variance, when the heading measurements are available. The attitude estimation output from the attitude filter is independent of any availability of the heading measurements, such that the attitude estimation output is available at all earth regions during operation of the vehicle.

Example 2 includes the AHRS of Example 1, wherein the vehicle comprises an aircraft, a helicopter, a missile, a spacecraft, a rocket, a boat, a submarine, an automobile, or a truck.

Example 3 includes the AHRS of any of Examples 1-2, wherein the IMU comprises a three-axis accelerometer and a three-axis gyroscope; and the heading source comprises a magnetometer.

Example 4 includes the AHRS of any of Examples 1-3, wherein the attitude estimation output is available when the vehicle is in operation at an earth polar region.

Example 5 includes the AHRS of any of Examples 1-4, wherein the attitude filter comprises an Earth rate model and a transport rate model.

Example 6 includes the AHRS of any of Examples 1-5, wherein the attitude filter further comprises a model of gravity variation errors.

Example 7 includes the AHRS of Example 6, wherein the the model of gravity variation errors comprises a first-order Gauss-Markov (GM-1) process defined by:

$$\delta \dot{b}_{grav}^{Pz} = -1/\tau_{grav} \delta b_{grav}^{Pz} + w_{GMgrav}^{P}$$

where $\tau_{grav}$ is a time constant of the GM-1 process; $\delta b_{grav}^{Pz}$ is a gravity variations estimation error; and $w_{GMgrav}^{P}$ is a driving noise of the GM-1 process.

Example 8 includes the AHRS of any of Examples 1-7, wherein the attitude estimates include roll and pitch estimates for the vehicle;

wherein a process model of the attitude filter is defined by the following expression:

$$\begin{bmatrix} \dot{\varepsilon}^B \\ \delta \dot{b}_{gyr}^B \\ \delta \dot{a}^B \\ \delta \dot{\omega}_{GM,IE}^P \\ \delta \dot{\omega}_{GM,EP}^P \\ \delta \dot{b}_{acc}^B \\ \delta \dot{b}_{grav}^{Pz} \end{bmatrix} = \begin{bmatrix} -[\hat{\omega}_{IB}^B \times] & I_3 & 0_{3\times 3} & \hat{C}_P^B & \hat{C}_P^B & 0_{3\times 3} & 0_{3\times 1} \\ 0_{3\times 3} & -1/\tau_{gyr} & 0_{3\times 3} & 0_{3\times 3} & 0_{3\times 3} & 0_{3\times 3} & 0_{3\times 1} \\ 0_{3\times 3} & 0_{3\times 3} & -1/\tau_{acceleration} & 0_{3\times 3} & 0_{3\times 3} & 0_{3\times 3} & 0_{3\times 1} \\ 0_{3\times 3} & 0_{3\times 3} & 0_{3\times 3} & -1/\tau_{GM,IE} & 0_{3\times 3} & 0_{3\times 3} & 0_{3\times 1} \\ 0_{3\times 3} & 0_{3\times 3} & 0_{3\times 3} & 0_{3\times 3} & -1/\tau_{GM,EP} & 0_{3\times 3} & 0_{3\times 1} \\ 0_{3\times 3} & 0_{3\times 3} & 0_{3\times 3} & 0_{3\times 3} & 0_{3\times 3} & -1/\tau_{acc} & 0_{3\times 1} \\ 0_{1\times 3} & 0_{1\times 3} & 0_{1\times 3} & 0_{1\times 3} & 0_{1\times 3} & 0_{1\times 3} & -1/\tau_{grav} \end{bmatrix}$$

-continued $$\begin{bmatrix} \epsilon^B \\ \delta b_{gyr}^B \\ \delta a^B \\ \delta \omega_{GM,IE}^P \\ \delta \omega_{GM,EP}^P \\ \delta b_{acc}^B \\ \delta b_{grav}^{Pz} \end{bmatrix} + \begin{bmatrix} -I_3 & 0_{3\times3} & 0_{3\times3} & 0_{3\times3} & 0_{3\times3} & 0_{3\times3} & 0_{3\times1} \\ 0_{3\times3} & I_3 & 0_{3\times3} & 0_{3\times3} & 0_{3\times3} & 0_{3\times3} & 0_{3\times1} \\ 0_{3\times3} & 0_{3\times3} & I_3 & 0_{3\times3} & 0_{3\times3} & 0_{3\times3} & 0_{3\times1} \\ 0_{3\times3} & 0_{3\times3} & 0_{3\times3} & I_3 & 0_{3\times3} & 0_{3\times3} & 0_{3\times1} \\ 0_{3\times3} & 0_{3\times3} & 0_{3\times3} & 0_{3\times3} & I_3 & 0_{3\times3} & 0_{3\times1} \\ 0_{3\times3} & 0_{3\times3} & 0_{3\times3} & 0_{3\times3} & 0_{3\times3} & I_3 & 0_{3\times1} \\ 0_{1\times3} & 0_{1\times3} & 0_{1\times3} & 0_{1\times3} & 0_{1\times3} & 0_{1\times3} & 1 \end{bmatrix} \begin{bmatrix} w_{gyr}^B \\ w_{GMgyrB}^B \\ w_{GMacceleration}^B \\ w_{GM,IE}^P \\ w_{GM,EP}^P \\ w_{GMaccB}^B \\ w_{GMgrav}^P \end{bmatrix}$$

where $\epsilon^B$ is attitude error in a body-frame of the vehicle; $\delta b_{gyr}^B$ is gyroscope bias error; $\tau_{gyr}$ is a time constant of a first-order Gauss-Markov (GM-1) process used to model gyroscope bias; $w_{GMgyrB}^B$ is a driving noise of the GM-1 process used to model the gyroscope bias; $\delta a^B$ is vehicle acceleration error; $\tau_{acceleration}$ is a time constant of the GM-1 process used to model vehicle acceleration; $w_{GMacceleration}^B$ is driving noise of the GM-1 process used to model the vehicle acceleration; $\delta\omega_{GM,IE}^P$ is Earth rate error in the platform frame (P-frame); $\tau_{GM,IE}$ is a time constant of the GM-1 process used to model the Earth rate; $w_{GM,IE}^P$ is driving noise of the GM-1 process used to model the Earth rate; $\delta\omega_{GM,EP}^P$ is transport rate error in the P-frame; $\tau_{GM,EP}$ is a time constant of the GM-1 process used to model the transport rate; $w_{GM,EP}^P$ is driving noise of the GM-1 process used to model the transport rate; $\delta b_{acc}^B$ is accelerometer bias error; $\tau_{acc}$ is a time constant of the GM-1 process used to model accelerometer bias; $w_{GMaccB}^B$ is a driving noise of the GM-1 process used to model the accelerometer bias; $\delta b_{grav}^{Pz}$ is equator-to-pole gravity variation error; $\tau_{grav}$ is a time constant of the GM-1 process used to model equator-to-pole gravity variation; and $w_{GMgrav}^P$ is a driving noise of the GM-1 process used to model the equator-to-pole gravity variation;

wherein a measurement model of the attitude filter is defined by the following expression:

$$[\delta \tilde{f}^B] = \left[\left[\left(\hat{C}_P^B\left(g^P - \begin{bmatrix} 0 \\ 0 \\ \hat{b}_{grav}^{Pz} \end{bmatrix}\right)\right)\right]x \quad 0_{3\times3} \quad I_3 \quad 0_{3\times3} \quad I_3 \quad \hat{C}_P^B(:,3)\right]$$

$$\begin{bmatrix} \epsilon^B \\ \delta b_{gyr}^B \\ \delta a^B \\ \delta \omega_{GM,IE}^P \\ \delta \omega_{GM,EP}^P \\ \delta b_{acc}^B \\ \delta b_{grav}^{Pz} \end{bmatrix} + [-I_3 \quad -\hat{C}_P^B] \begin{bmatrix} w_{sf}^B \\ w_{grav}^P \end{bmatrix}$$

where $\delta \tilde{f}^B$ is specific force measurement error; $\hat{C}_P^B$ is a direction cosine matrix transforming a vector from the P-frame to the body-frame; $g^P$ is a gravity vector expressed in the P-frame; $\hat{b}_{grav}^{Pz}$ is an estimated Gravity variation; $w_{sf}^B$ is specific force measurement noise; and $w_{grav}^P$ is a gravity model measurement noise.

Example 9 includes the AHRS of any of Examples 1-8, wherein the heading mean estimate from the heading filter includes a yaw estimate for the vehicle;

wherein a process model of the heading filter is defined by the following expression:

$$\begin{bmatrix} \delta \dot{\psi} \\ \delta \dot{b}_{gyr}^{By} \\ \delta \dot{b}_{gyr}^{Bz} \\ \delta \dot{\omega}_{GM,ETR}^{Nz} \end{bmatrix} = \begin{bmatrix} 0 & -\dfrac{\sin\hat{\phi}}{\cos\hat{\theta}} & -\dfrac{\cos\hat{\phi}}{\cos\hat{\theta}} & -1 \\ 0 & -1/\tau_{gyr}^{By} & 0 & 0 \\ 0 & 0 & -1/\tau_{gyr}^{Bz} & 0 \\ 0 & 0 & 0 & -1/\tau_{GM,ETR}^{Nz} \end{bmatrix}$$

$$\begin{bmatrix} \delta \psi \\ \delta b_{gyr}^{By} \\ \delta b_{gyr}^{Bz} \\ \delta \omega_{GM,ETR}^{Nz} \end{bmatrix} + \begin{bmatrix} 1 & -\cos\hat{\phi}\tan\hat{\theta} & -\sin\hat{\phi}\tan\hat{\theta} & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} w_{\omega,att} \\ w_{ETR}^{Nx} \\ w_{ETR}^{Ny} \\ w_{GMgyrB}^{By} \\ w_{GMgyrB}^{Bz} \\ w_{GM,ETR}^{Nz} \end{bmatrix}$$

where $\hat{\phi}$ and $\hat{\theta}$ are estimated roll and pitch angle from the attitude filter, respectively; $\delta b_{gyr}^{By}$ is a gyroscope lateral axis bias error; $\tau_{gyr}^{By}$ is a time constant of the GM-1 process used to model the gyroscope lateral axis bias error; $w_{GMgyrB}^{By}$ is the driving noise of the GM-1 process used to model the lateral axis gyroscope bias error; $\delta b_{gyr}^{Bz}$ is gyroscope vertical axis bias error; $\tau_{gyr}^{Bz}$ is a time constant of the GM-1 process used to model the gyroscope vertical axis bias error; $w_{GMgyrB}^{Bz}$ is a driving noise of the GM-1 process used to model the gyroscope vertical axis bias error; $\delta\omega_{GM,ETR}^{Nz}$ is a error in z-axis angular velocity of a navigation frame (N-frame) of the vehicle; $\tau_{GM,ETR}^{Nz}$ is a time constant of the GM-1 process used to model the z-axis angular velocity of the N-frame; $w_{GM,ETR}^{Nz}$ is a driving noise of the GM-1 process used to model the z-axis angular velocity of the N-frame; $w_{ETR}^{Nx}$ and $w_{ETR}^{Ny}$ are horizontal white noises for the Earth and transport rate models expressed in the N-frame; and the steady-state variance of $w_{\omega,att}$ is defined by the following equation:

$$\sigma_{\omega,att}^2 = J_{(\hat{\phi},\hat{\theta},\hat{\omega}_{gyr}^{By},\hat{\omega}_{gyr}^{Bz})}^{w_{\omega,att}} \begin{bmatrix} P_{\hat{\phi},\hat{\theta}} & 0_{2\times2} \\ 0_{2\times2} & P_{w_{gyr}^{By,Bz}} \end{bmatrix} \left(J_{(\hat{\phi},\hat{\theta},\hat{\omega}_{gyr}^{Bz})}^{w_{\omega,att}}\right)^T$$

where $P_{\hat{\phi},\hat{\theta}}$ is the roll and pitch angle cross-covariance matrix, obtained from the attitude filter, $P_{w_{gyr}^{By,Bz}}$ is gyroscope y-axis and z-axis white noise cross-covariance matrix; and $$J^{w_\omega,att}_{(\hat{\phi},\hat{\theta},\hat{\omega}_{gyr}^{By},\hat{\omega}_{gyr}^{Bz})}$$

is evaluated at the point $(\hat{\phi},\hat{\theta},\hat{\omega}_{gyr}^{By},\hat{\omega}_{gyr}^{Bz})$, and is defined as:

$$J^{w_\omega,att}_{(\hat{\phi},\hat{\theta},\hat{\omega}_{gyr}^{By},\hat{\omega}_{gyr}^{Bz})} = \begin{bmatrix} \frac{\partial \delta\omega_{gyr}}{\partial \phi} & \frac{\partial \delta\omega_{gyr}}{\partial \theta} & \frac{\partial \sigma\omega_{gyr}}{\partial \omega_{IB}^{By}} & \frac{\partial \delta\omega_{gyr}}{\partial \omega_{IB}^{Bz}} \end{bmatrix}\bigg|_{(\hat{\phi},\hat{\theta},\hat{\omega}_{gyr}^{By},\hat{\omega}_{gyr}^{Bz})};$$

wherein a measurement model of the heading filter is defined by the following equation:

$$[\delta\tilde{\psi}] = \begin{bmatrix} 1 & 0 & 0 & 0 \end{bmatrix} \begin{bmatrix} \delta\psi \\ \delta b_{gyr}^{By} \\ \delta b_{gyr}^{Bz} \\ \delta\omega_{GM,ETR}^{Nz} \end{bmatrix} - w_\psi$$

where $\delta\psi$ is a heading error; $w_\psi$ is a heading measurement noise; and $\delta\tilde{\psi}$ is the error in the heading measurement.

Example 10 includes a method for operating an AHRS for navigating a vehicle, the method comprising obtaining inertial measurements from an IMU onboard the vehicle during movement of the vehicle; inputting the inertial measurements into an attitude filter onboard the vehicle; computing, in the attitude filter, an attitude estimation comprising attitude estimates and covariances for the attitude estimates, based on the inertial measurements; obtaining heading measurements, when available, from a heading source onboard the vehicle; inputting the heading measurements into a heading filter onboard the vehicle; sending the attitude estimation, comprising the attitude estimates and the covariances for the attitude estimates, from the attitude filter to the heading filter; computing, in the heading filter, a heading estimation comprising a heading mean estimate and a heading variance, based on the heading measurements and the attitude estimation; outputting the heading estimation, comprising the heading mean estimate and the heading variance, when the heading measurements are available, from the heading filter for use in navigation of the vehicle; and outputting the attitude estimation from the attitude filter, independent of when the heading measurements are available, such that the attitude estimation is available at all earth regions for use in navigation of the vehicle.

Example 11 includes the method of Example 10, wherein the vehicle comprises an aircraft, a helicopter, a missile, a spacecraft, a rocket, a boat, a submarine, an automobile, or a truck.

Example 12 includes the method of any of Examples 10-11, wherein the attitude estimation output is available when the vehicle is in operation at an earth polar region.

Example 13 includes the method of any of Examples 10-12, wherein the attitude estimates include roll and pitch estimates for the vehicle.

Example 14 includes the method of any of Examples 10-13, wherein the heading mean estimate includes a yaw estimate for the vehicle.

Example 15 includes the method of any of Examples 10-14, wherein the attitude filter comprises an Earth rate model and a transport rate model.

Example 16 includes the method of any of Examples 10-15, wherein the attitude filter further comprises a model of gravity variation errors.

Example 17 includes the method of any of Examples 10-16, wherein the model of gravity variation errors comprises a GM-1 process defined by:

$$\delta\dot{b}_{grav}^{Pz} = -1/\tau_{grav}\delta b_{grav}^{Pz} + w_{GMgrav}^{P}$$

where $\tau_{grav}$ is a time constant of the GM-1 process; $\delta b_{grav}^{Pz}$ is a gravity variations estimation error; and $w_{GMgrav}^{P}$ is a driving noise of the GM-1 process.

Example 18 includes a computer program product comprising a non-transitory computer readable medium having instructions stored thereon executable by a processor to perform a method for operating an AHRS for navigating a vehicle, the method comprising: obtaining inertial measurements from an IMU onboard the vehicle during movement of the vehicle; inputting the inertial measurements into an attitude filter onboard the vehicle; computing, in the attitude filter, an attitude estimation comprising attitude estimates and covariances for the attitude estimates, based on the inertial measurements; obtaining heading measurements, when available, from a heading source onboard the vehicle; inputting the heading measurements into a heading filter onboard the vehicle; sending the attitude estimation, comprising the attitude estimates and the covariances for the attitude estimates, from the attitude filter to the heading filter; computing, in the heading filter, a heading estimation comprising a heading mean estimate and a heading variance, based on the heading measurements and the attitude estimation; outputting the heading estimation, comprising the heading mean estimate and the heading variance, when the heading measurements are available, from the heading filter for use in navigation of the vehicle; and outputting the attitude estimation from the attitude filter, independent of when the heading measurements are available, such that the attitude estimation is available at all earth regions for use in navigation of the vehicle.

Although specific embodiments have been illustrated and described herein, it will be appreciated by those of ordinary skill in the art that any arrangement, which is suitable to achieve the same purpose, may be substituted for the specific embodiments shown. Therefore, it is manifestly intended that this invention be limited only by the claims and the equivalents thereof.

What is claimed is:

1. An attitude and heading reference system (AHRS) for a vehicle, the AHRS comprising:
   an inertial measurement unit (IMU) onboard the vehicle and configured to generate inertial measurements comprising angular rate and acceleration measurements during operation of the vehicle;
   a heading source onboard the vehicle and configured to generate heading measurements during operation of the vehicle;
   an attitude filter onboard the vehicle and in operative communication with the IMU; and
   a heading filter onboard the vehicle and in operative communication with the heading source;
   wherein the attitude filter is configured to:
     receive the inertial measurements from the IMU;
     compute an attitude estimation, comprising attitude estimates and covariances for the attitude estimates, based on the inertial measurements, wherein the attitude estimation is independent of a geographic latitude of the vehicle, and is based on an error parameterization performed between a floating platform frame of the vehicle, not corrected for gyroscope sensor errors, and a body frame of reference, wherein earth and transport rates are estimated in the platform frame, avoiding a polar singularity; and output the attitude estimation, comprising the attitude estimates and the covariances for the attitude estimates;

wherein the heading filter is configured to:

receive the heading measurements, when available, from the heading source;

receive the attitude estimation, comprising the attitude estimates and the covariances for the attitude estimates, from the attitude filter;

compute a heading estimation, comprising a heading mean estimate and a heading variance, based on the heading measurements and the attitude estimation; and output the heading estimation, comprising the heading mean estimate and the heading variance, when the heading measurements are available;

wherein the attitude estimation output from the attitude filter is independent of any availability of the heading measurements, such that the attitude estimation output is available at all earth regions during operation of the vehicle.

2. The AHRS of claim 1, wherein the vehicle comprises an aircraft, a helicopter, a missile, a spacecraft, a rocket, a boat, a submarine, an automobile, or a truck.

3. The AHRS of claim 1, wherein:

the IMU comprises a three-axis accelerometer and a three-axis gyroscope; and the heading source comprises a magnetometer.

4. The AHRS of claim 1, wherein the attitude estimation output is available when the vehicle is in operation at an earth polar region.

5. The AHRS of claim 1, wherein the attitude filter comprises an Earth rate model and a transport rate model.

6. The AHRS of claim 5, wherein the attitude filter further comprises a model of gravity variation errors.

7. The AHRS of claim 6, wherein the model of gravity variation errors comprises a first-order Gauss-Markov (GM-1) process defined by:

$$\delta \dot{b}_{grav}^{Pz} = -1/\tau_{grav} \delta b_{grav}^{Pz} + w_{GMgrav}^{P}$$

where $\tau_{grav}$ is a time constant of the GM-1 process; $\delta b_{grav}^{Pz}$ is a gravity variations estimation error; and $w_{GMgrav}^{P}$ is a driving noise of the GM-1 process.

8. The AHRS of claim 1, wherein the attitude estimates include roll and pitch estimates for the vehicle;

wherein a process model of the attitude filter is defined by the following expression:

$$\begin{bmatrix} \dot{\varepsilon}^B \\ \delta \dot{b}_{gyr}^B \\ \delta \dot{a}^B \\ \delta \dot{\omega}_{GM,IE}^P \\ \delta \dot{\omega}_{GM,EP}^P \\ \delta \dot{b}_{acc}^B \\ \delta \dot{b}_{grav}^{Pz} \end{bmatrix} = \begin{bmatrix} -[\hat{\omega}_{IB}^B \times] & I_3 & 0_{3\times3} & \hat{C}_P^B & \hat{C}_P^B & 0_{3\times3} & 0_{3\times1} \\ 0_{3\times3} & -1/\tau_{gyr} & 0_{3\times3} & 0_{3\times3} & 0_{3\times3} & 0_{3\times3} & 0_{3\times1} \\ 0_{3\times3} & 0_{3\times3} & -1/\tau_{acceleration} & 0_{3\times3} & 0_{3\times3} & 0_{3\times3} & 0_{3\times1} \\ 0_{3\times3} & 0_{3\times3} & 0_{3\times3} & -1/\tau_{GM,IE} & 0_{3\times3} & 0_{3\times3} & 0_{3\times1} \\ 0_{3\times3} & 0_{3\times3} & 0_{3\times3} & 0_{3\times3} & -1/\tau_{GM,EP} & 0_{3\times3} & 0_{3\times1} \\ 0_{3\times3} & 0_{3\times3} & 0_{3\times3} & 0_{3\times3} & 0_{3\times3} & -1/\tau_{acc} & 0_{3\times1} \\ 0_{1\times3} & 0_{1\times3} & 0_{1\times3} & 0_{1\times3} & 0_{1\times3} & 0_{1\times3} & -1/\tau_{grav} \end{bmatrix} \begin{bmatrix} \varepsilon^B \\ \delta b_{gyr}^B \\ \delta a^B \\ \delta \omega_{GM,IE}^P \\ \delta \omega_{GM,EP}^P \\ \delta b_{acc}^B \\ \delta b_{grav}^{Pz} \end{bmatrix} + \begin{bmatrix} -I_3 & 0_{3\times3} & 0_{3\times3} & 0_{3\times3} & 0_{3\times3} & 0_{3\times3} & 0_{3\times1} \\ 0_{3\times3} & I_3 & 0_{3\times3} & 0_{3\times3} & 0_{3\times3} & 0_{3\times3} & 0_{3\times1} \\ 0_{3\times3} & 0_{3\times3} & I_3 & 0_{3\times3} & 0_{3\times3} & 0_{3\times3} & 0_{3\times1} \\ 0_{3\times3} & 0_{3\times3} & 0_{3\times3} & I_3 & 0_{3\times3} & 0_{3\times3} & 0_{3\times1} \\ 0_{3\times3} & 0_{3\times3} & 0_{3\times3} & 0_{3\times3} & I_3 & 0_{3\times3} & 0_{3\times1} \\ 0_{3\times3} & 0_{3\times3} & 0_{3\times3} & 0_{3\times3} & 0_{3\times3} & I_3 & 0_{3\times1} \\ 0_{1\times3} & 0_{1\times3} & 0_{1\times3} & 0_{1\times3} & 0_{1\times3} & 0_{1\times3} & 1 \end{bmatrix} \begin{bmatrix} w_{gyr}^B \\ w_{GMgyrB}^B \\ w_{GMacceleration}^B \\ w_{GM,IE}^P \\ w_{GM,EP}^P \\ w_{GMaccB}^B \\ w_{GMgrav}^P \end{bmatrix}$$

where $\varepsilon^B$ is attitude error in a body-frame of the vehicle; $\delta b_{gyr}^B$ is gyroscope bias error; $\tau_{gyr}$ is a time constant of a first-order Gauss-Markov (GM-1) process used to model gyroscope bias; $w_{GMgyrB}^B$ is a driving noise of the GM-1 process used to model the gyroscope bias; $\delta a^B$ is vehicle acceleration error; $\tau_{acceleration}$ is a time constant of the GM-1 process used to model vehicle acceleration; $w_{GMacceleration}^B$ is driving noise of the GM-1 process used to model the vehicle acceleration; $\delta \omega_{GM,IE}^P$ is Earth rate error in the platform frame (P-frame); $\tau_{GM,IE}$ is a time constant of the GM-1 process used to model the Earth rate; $w_{GM,IE}^P$ is driving noise of the GM-1 process used to model the Earth rate; $\delta \omega_{GM,EP}^P$ is transport rate error in the P-frame; $\tau_{GM,EP}$ is a time constant of the GM-1 process used to model the transport rate; $w_{GM,EP}^P$ is driving noise of the GM-1 process used to model the transport rate; $\delta b_{acc}^B$ is accelerometer bias error; $\tau_{acc}$ is a time constant of the GM-1 process used to model accelerometer bias; $w_{GMaccB}^B$ is a driving noise of the GM-1 process used to model the accelerometer bias; $\delta b_{grav}^{Pz}$ equator-to-pole gravity variation error; $\tau_{grav}$ is a time constant of the GM-1 process used to model equator-to-pole gravity variation; and $w_{GMgrav}^P$ is a driving noise of the GM-1 process used to model the equator-to-pole gravity variation;

wherein a measurement model of the attitude filter is defined by the following expression:

$$[\delta \tilde{f}^B] = \left[\left[\left[\hat{C}_P^B\left(g^P - \begin{bmatrix} 0 \\ 0 \\ \hat{b}_{grav}^{Pz} \end{bmatrix}\right)\right] \times \right] \quad 0_{3\times 3} \quad I_3 \quad 0_{3\times 3} \quad 0_{3\times 3} \quad I_3 \quad \hat{C}_P^B(:,3)\right]$$

$$\begin{bmatrix} \varepsilon^B \\ \delta b_{gyr}^B \\ \delta a^B \\ \delta \omega_{GM,IE}^P \\ \delta \omega_{GM,EP}^P \\ \delta b_{acc}^B \\ \delta b_{grav}^{Pz} \end{bmatrix} + [-I_3 \quad -\hat{C}_P^B]\begin{bmatrix} w_{sf}^B \\ w_{grav}^P \end{bmatrix}$$

where $\delta \tilde{f}^B$ is specific force measurement error; $\hat{C}_P^B$ is a direction cosine matrix transforming a vector from the P-frame to the body-frame; $g^P$ is a gravity vector expressed in the P-frame; $\hat{b}_{grav}^{Pz}$ is an estimated Gravity variation; $w_{sf}^B$ is specific force measurement noise; and $w_{grav}^P$ is a gravity model measurement noise.

9. The AHRS of claim 8, wherein the heading mean estimate from the heading filter includes a yaw estimate for the vehicle;

wherein a process model of the heading filter is defined by the following expression:

$$\begin{bmatrix} \delta \dot{\psi} \\ \delta \dot{b}_{gyr}^{By} \\ \delta \dot{b}_{gyr}^{Bz} \\ \delta \dot{\omega}_{GM,ETR}^{Nz} \end{bmatrix} = \begin{bmatrix} 0 & -\dfrac{\sin\hat{\phi}}{\cos\hat{\theta}} & -\dfrac{\cos\hat{\phi}}{\cos\hat{\theta}} & -1 \\ 0 & -1/\tau_{gyr}^{By} & 0 & 0 \\ 0 & 0 & -1/\tau_{gyr}^{Bz} & 0 \\ 0 & 0 & 0 & -1/\tau_{GM,ETR}^{Nz} \end{bmatrix}$$

$$\begin{bmatrix} \delta\psi \\ \delta b_{gyr}^{By} \\ \delta b_{gyr}^{Bz} \\ \delta \omega_{GM,ETR}^{Nz} \end{bmatrix} + \begin{bmatrix} 1 & -\cos\hat{\psi}\tan\hat{\theta} & -\sin\hat{\phi}\tan\hat{\theta} & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} w_{\omega,att} \\ w_{ETR}^{Nx} \\ w_{ETR}^{Ny} \\ w_{GMgyrB}^{By} \\ w_{GMgyrB}^{Bz} \\ w_{GM,ETR}^{Nz} \end{bmatrix}$$

where $\hat{\phi}$ and $\hat{\theta}$ are estimated roll and pitch angle from the attitude filter, respectively; $\delta b_{gyr}^{By}$ is a gyroscope lateral axis bias error; $\tau_{gyr}^{By}$ is a time constant of the GM-1 process used to model the gyroscope lateral axis bias error; $w_{GMgyrB}^{By}$ is the driving noise of the GM-1 process used to model the lateral axis gyroscope bias error; $\delta b_{gyr}^{Bz}$ is gyroscope vertical axis bias error; $\tau_{gyr}^{Bz}$ is a time constant of the GM-1 process used to model the gyroscope vertical axis bias error; $w_{GMgyrB}^{Bz}$ is a driving noise of the GM-1 process used to model the gyroscope vertical axis bias error; $\delta \omega_{GM,ETR}^{Nz}$ is a error in z-axis angular velocity of a navigation frame (N-frame) of the vehicle; $\tau_{GM,ETR}^{Nz}$ is a time constant of the GM-1 process used to model the z-axis angular velocity of the N-frame; $w_{GM,ETR}^{Nz}$ is a driving noise of the GM-1 process used to model the z-axis angular velocity of the N-frame; $w_{ETR}^{Nx}$ and $w_{ETR}^{Ny}$ are horizontal white noises for the Earth and transport rate models expressed in the N-frame; and the steady-state variance of $w_{\omega,att}$ is defined by the following equation:

$$\sigma_{\omega,att}^2 = J_{(\hat{\phi},\hat{\theta},\hat{\omega}_{gyr}^{By},\hat{\omega}_{gyr}^{Bz})}^{w_{\omega,att}} \begin{bmatrix} P_{\hat{\phi},\hat{\theta}} & 0_{2\times 2} \\ 0_{2\times 2} & P_{w_{gyr}^{By,Bz}} \end{bmatrix} \left(J_{(\hat{\phi},\hat{\theta},\hat{\omega}_{gyr}^{By},\hat{\omega}_{gyr}^{Bz})}^{w_{\omega,att}}\right)^T$$

where $P_{\hat{\phi},\hat{\theta}}$ is the roll and pitch angle cross-covariance matrix, obtained from the attitude filter, $P_{w_{gyr}}^{By,Bz}$ is the gyroscope y-axis and z-axis white noise cross-covariance matrix, and $$J_{(\hat{\phi},\hat{\theta},\hat{\omega}_{gyr}^{By},\hat{\omega}_{gyr}^{Bz})}^{w_{\omega,att}}$$

is evaluated at the point $(\hat{\phi},\hat{\theta},\hat{\omega}_{gyr}^{By},\hat{\omega}_{gyr}^{Bz})$, and is defined as:

$$J_{(\hat{\phi},\hat{\theta},\hat{\omega}_{gyr}^{By},\hat{\omega}_{gyr}^{Bz})}^{w_{\omega,att}} = \left[\dfrac{\partial \delta\omega_{gyr}}{\partial \phi} \quad \dfrac{\partial \delta\omega_{gyr}}{\partial \theta} \quad \dfrac{\partial \sigma_{\omega gyr}}{\partial \omega_{IB}^{By}} \quad \dfrac{\partial \delta\omega_{gyr}}{\partial \omega_{IB}^{Bz}}\right]_{(\hat{\phi},\hat{\theta},\hat{\omega}_{gyr}^{By},\hat{\omega}_{gyr}^{Bz})};$$

wherein a measurement model of the heading filter is defined by the following equation:

$$[\delta\tilde{\psi}] = [1 \quad 0 \quad 0 \quad 0]\begin{bmatrix} \delta\psi \\ \delta b_{gyr}^{By} \\ \delta b_{gyr}^{Bz} \\ \delta\omega_{GM,ETR}^{Nz} \end{bmatrix} - w_\psi$$

where $\delta\psi$ is a heading error; $w_\psi$ is a heading measurement noise; and $\delta\tilde{\psi}$ is the error in the heading measurement.

10. A method for operating an attitude and heading reference system (AHRS) for navigating a vehicle, the method comprising:
  obtaining inertial measurements from an inertial measurement unit (IMU) onboard the vehicle during movement of the vehicle;
  inputting the inertial measurements into an attitude filter onboard the vehicle;
  computing, in the attitude filter, an attitude estimation comprising attitude estimates and covariances for the attitude estimates, based on the inertial measurements;
  obtaining heading measurements, when available, from a heading source onboard the vehicle;
  inputting the heading measurements into a heading filter onboard the vehicle;
  sending the attitude estimation, comprising the attitude estimates and the covariances for the attitude estimates, from the attitude filter to the heading filter;
  computing, in the heading filter, a heading estimation comprising a heading mean estimate and a heading variance, based on the heading measurements and the attitude estimation;
  outputting the heading estimation, comprising the heading mean estimate and the heading variance, when the heading measurements are available, from the heading filter for use in navigation of the vehicle; and
  outputting the attitude estimation from the attitude filter, independent of when the heading measurements are available, such that the attitude estimation is available at all earth regions for use in navigation of the vehicle.

11. The method of claim 10, wherein the vehicle comprises an aircraft, a helicopter, a missile, a spacecraft, a rocket, a boat, a submarine, an automobile, or a truck.

12. The method of claim 10, wherein the attitude estimation output is available when the vehicle is in operation at an earth polar region.

13. The method of claim 10, wherein the attitude estimates include roll and pitch estimates for the vehicle.

14. The method of claim 13, wherein the heading mean estimate includes a yaw estimate for the vehicle.

15. The method of claim 10, wherein the attitude filter comprises an Earth rate model and a transport rate model.

16. The method of claim 15, wherein the attitude filter further comprises a model of gravity variation errors.

17. The method of claim 16, wherein the model of gravity variation errors comprises a first-order Gauss-Markov (GM-1) process defined by:

$$\delta \dot{b}_{grav}^{Pz} = -1/\tau_{grav} \delta b_{grav}^{Pz} + w_{GMgrav}^{P}$$

where $\tau_{grav}$ is a time constant of the GM-1 process; $\delta b_{grav}^{Pz}$ is a gravity variations estimation error; and $w_{GMgrav}^{P}$ is a driving noise of the GM-1 process.

18. A computer program product comprising:
a non-transitory computer readable medium having instructions stored thereon executable by a processer to perform a method for operating an attitude and heading reference system (AHRS) for navigating a vehicle, the method comprising:
obtaining inertial measurements from an inertial measurement unit (IMU) onboard the vehicle during movement of the vehicle;
inputting the inertial measurements into an attitude filter onboard the vehicle;
computing, in the attitude filter, an attitude estimation comprising attitude estimates and covariances for the attitude estimates, based on the inertial measurements;
obtaining heading measurements, when available, from a heading source onboard the vehicle; inputting the heading measurements into a heading filter onboard the vehicle;
sending the attitude estimation, comprising the attitude estimates and the covariances for the attitude estimates, from the attitude filter to the heading filter;
computing, in the heading filter, a heading estimation comprising a heading mean estimate and a heading variance, based on the heading measurements and the attitude estimation;
outputting the heading estimation, comprising the heading mean estimate and the heading variance, when the heading measurements are available, from the heading filter for use in navigation of the vehicle; and
outputting the attitude estimation from the attitude filter, independent of when the heading measurements are available, such that the attitude estimation is available at all earth regions for use in navigation of the vehicle.

* * * * *

UNITED STATES PATENT AND TRADEMARK OFFICE
CERTIFICATE OF CORRECTION

PATENT NO. : 10,048,074 B1
APPLICATION NO. : 15/461028
DATED : August 14, 2018
INVENTOR(S) : Malinak et al.

Page 1 of 1

It is certified that error appears in the above-identified patent and that said Letters Patent is hereby corrected as shown below:

In the Claims

At Column 16, Line 61, please replace "equator-to-pole gravity variation error;" with "is equator-to-pole gravity variation error;"

At Column 18, Line 19, please replace " $\dfrac{\partial \sigma \omega_{gyr}}{\partial \omega_{IB}^{By}}$ " with " $\dfrac{\partial \delta \omega_{gyr}}{\partial \omega_{IB}^{By}}$ "

Signed and Sealed this
Twelfth Day of November, 2019

Andrei Iancu
*Director of the United States Patent and Trademark Office*